United States Patent
Ramaraju et al.

(10) Patent No.: US 9,116,799 B2
(45) Date of Patent: Aug. 25, 2015

(54) METHOD FOR DETECTING BANK COLLISION AT A MEMORY AND DEVICE THEREFOR

(71) Applicants: Ravindraraj Ramaraju, Round Rock, TX (US); Kathryn C. Stacer, Round Rock, TX (US)

(72) Inventors: Ravindraraj Ramaraju, Round Rock, TX (US); Kathryn C. Stacer, Round Rock, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 282 days.

(21) Appl. No.: 13/931,945

(22) Filed: Jun. 30, 2013

(65) Prior Publication Data

US 2015/0006827 A1    Jan. 1, 2015

(51) Int. Cl.
*G06F 12/00* (2006.01)
*G06F 12/06* (2006.01)
*G06F 9/52* (2006.01)

(52) U.S. Cl.
CPC . *G06F 12/06* (2013.01); *G06F 9/52* (2013.01)

(58) Field of Classification Search
None
See application file for complete search history.

(56) References Cited

U.S. PATENT DOCUMENTS

| | | | |
|---|---|---|---|
| 4,924,422 A | 5/1990 | Vassiliadis et al. | |
| 5,754,819 A | 5/1998 | Lynch et al. | |
| 5,761,521 A | 6/1998 | Chilinski et al. | |
| 5,777,628 A | 7/1998 | Buck-Gengler | |
| 5,893,930 A | 4/1999 | Song | |
| 6,088,763 A | 7/2000 | Silberman et al. | |
| 6,374,342 B1 | 4/2002 | Sasahara | |
| 6,425,044 B1 | 7/2002 | Jeddeloh | |
| 6,681,313 B1 | 1/2004 | Trong et al. | |
| 6,707,752 B2 | 3/2004 | Zhang | |
| 6,711,654 B2 | 3/2004 | Rangan | |
| 6,738,890 B2 | 5/2004 | Ishikawa et al. | |
| 6,904,446 B2 | 6/2005 | Dibrino | |
| 6,944,088 B2 | 9/2005 | Asano et al. | |
| 6,957,315 B2 | 10/2005 | Chauvel | |
| 7,089,360 B1 | 8/2006 | Zhang | |
| 7,286,423 B2 | 10/2007 | Ramaraju | |
| 7,363,436 B1 | 4/2008 | Yeh et al. | |
| 7,669,034 B2 | 2/2010 | Bearden et al. | |
| 7,836,435 B2 | 11/2010 | Zhang et al. | |
| 7,984,229 B2 | 7/2011 | Ramaraju et al. | |
| 8,090,757 B2 | 1/2012 | Takahashi et al. | |
| 8,099,580 B2 | 1/2012 | Ramaraju et al. | |

(Continued)

OTHER PUBLICATIONS

Austin, T. et al., "Streamlining Data Cache Access with Fast Address Calculation," IEEE Proceedings of the 22nd Annual International Symposium on Computer Architecture, Jun. 22-24, 1995; pp. 369-380.

(Continued)

*Primary Examiner* — Baboucarr Faal

(57) ABSTRACT

A pipeline circuit determines a first effective address based a sum of a first value and a second value. The first effective address is based upon an actual value of a carry-in into a bit-wise region of the first and second values. The bit-wise region includes a predefined internal region of bits of the first and second values. The pipeline circuit also determines a second effective address based a sum of a third value and a fourth value. A collision detector circuit receives bits from the bit-wise region of each of the four values and determines a plurality of speculative results based upon the bits of the bit-wise regions and based upon a plurality of speculative carry-in values. A collision indicator is asserted based on at least one result of the plurality of speculative results, and the actual values of the first and second carry-in.

20 Claims, 9 Drawing Sheets

(56) References Cited

U.S. PATENT DOCUMENTS

| | | | |
|---|---|---|---|
| 8,356,160 | B2 | 1/2013 | Muff et al. |
| 8,380,779 | B2 | 2/2013 | Bruce et al. |
| 2003/0110198 | A1 | 6/2003 | Park |
| 2004/0133843 | A1 | 7/2004 | Yamakawa |
| 2005/0055490 | A1 | 3/2005 | Widell et al. |
| 2007/0028051 | A1 | 2/2007 | Williamson et al. |
| 2007/0033318 | A1 | 2/2007 | Gilday et al. |
| 2007/0094480 | A1 | 4/2007 | Ramaraju et al. |

OTHER PUBLICATIONS

Cortadella, J. et al., "Evaluation of A+B=K Conditions Without Carry Propagation," IEEE Transactions on Computers, vol. 41, No. 11, Nov. 1992; pp. 1484-1488.

Kwon, O. et al., "A 16-Bit by 16-Bit MAC Design Fast 5:3 Compressor Cells," Journal of VLSI Signal Processing 31, 77-89; Jun. 1, 2002; Kluwer Academic Publishers; pp. 77-89.

U.S. Appl. No. 13/440,728, filed Apr. 5, 2012, entitled "System and Method for Cache Access".

U.S. Appl. No. 13/831,580, filed Mar. 15, 2013, entitled "Method and Apparatus for Detecting a Collision Between Multiple Threads of Execution for Accessing a Memory Array".

Heald, R. et al., "64 kB Sum-Addressed-Memory Cache with 1.6-ns Cycle and 2.6-ns Latency," IEEE Journal of Solid-State Circuits, vol. 33, issue 11, Nov. 1998, pp. 1682-1689.

Juan, T., et al., "Reducing TLB Power Requirements," IEEE 1997 International Symposium on Low Power Electronics and Design, Aug. 18-20, 1997, pp. 196-201.

Non-Final Office Action mailed Jul. 19, 2012 for U.S. Appl. No. 12/474,451, 8 pages.

Notice of Allowance mailed Oct. 29, 2012 for U.S. Appl. No. 12/474,451, 6 pages.

Lynch, W. et al., "Low Load Latency through Sum-Addressed Memory (SAM)," IEEE Proceedings of the 25th Annual International Symposium on Computer Architecture; Jun. 27, 1998-Jul. 1, 2008; ISBN:0-8186-8491-7; pp. 369-379.

Non-Final Office Action mailed Jun. 4, 2015 for U.S. Appl. No. 13/831,850 13 pages.

600

METHOD FOR DETECTING BANK COLLISION AT A MEMORY AND DEVICE THEREFOR

CROSS-REFERENCE TO RELATED APPLICATION(S)

The present application is related to co-pending U.S. patent application Ser. No. 13/831,850, entitled "METHOD AND APPARATUS FOR DETECTING A COLLISION BETWEEN MULTIPLE THREADS OF EXECUTION FOR ACCESSING A MEMORY ARRAY," filed on Mar. 15, 2013, the entirety of which is herein incorporated by reference.

The present application is related to issued U.S. patent application Ser. No. 12/474,451 (now U.S. Pat. No. 8,380,779), entitled "TECHNIQUE FOR DETERMINING IF A LOGICAL SUM OF A FIRST OPERAND AND A SECOND OPERAND IS THE SAME AS A THIRD OPERAND," filed on May 29, 2009, the entirety of which is herein incorporated by reference.

BACKGROUND

1. Field of the Disclosure

This disclosure relates generally to controlling memory accesses and, more specifically, to detecting a bank collision at a memory.

2. Description of the Related Art

A data processing system generally includes one or more memory devices for storing information. For example, a memory device can store instructions that can be executed by the data processing system. A memory device also can store data in response to execution of the instructions, and the stored data can be retrieved from the memory device. A data processing system may be configured to execute two or more program threads concurrently. Each program thread may independently seek to access a memory device. A memory device that supports concurrent accesses can be referred to as a multi-port memory. However, there may be restrictions with multi-port memories that prevent certain accesses from simultaneously accessing a memory location or range of memory locations, depending on how the multi-port memory device is implemented. For example, a memory device can be organized as a plurality of memory banks, and the memory device may not permit simultaneous read and write accesses at locations within the same memory bank. Such accesses are said to collide.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE DRAWINGS

Figure 1:
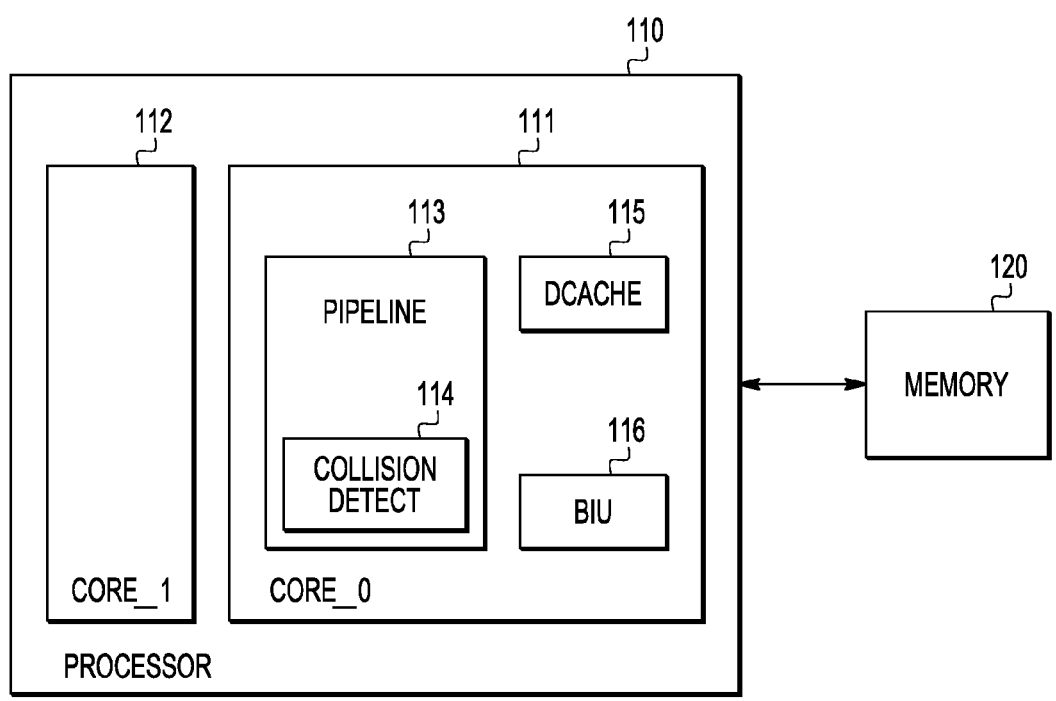
FIG. 1 is a block diagram illustrating a data processing system according to a specific embodiment of the present disclosure.

A method and apparatus is disclosed for detecting whether two memory access requests are attempting to access the same memory bank at a memory device. For example, a data processing device can execute two or more program threads concurrently. Each program thread can operate independently, resulting in multiple access requests attempting to access a memory device simultaneously. The memory device can have more than one access port to support parallel accesses; however the memory device may impose restrictions that prevent some accesses from being performed simultaneously due to how the memory device is organized and implemented. For example, a memory device may be organized to include a plurality of memory banks, and may not allow simultaneous access to the same bank if one or both of the accesses is a write operation. Such disallowed accesses are said to collide.

Each memory access request includes an effective address identifying a location within a memory device that is to be accessed. For example, an effective address may include sixty-four binary bits, extending from a least-significant bit, zero, to a most significant bit, sixty-three. Depending on the particular organization of the memory device, address bits included at a particular bit-wise region of an effective address can be used to select one of a plurality of memory banks within the memory device. For the examples described below, the values of address bits eight, seven, and six are used to select one of eight memory banks within a memory device. Therefore, if the values of these three bits are the same for two memory access requests, then the memory locations corresponding to each request will both reside within the same memory bank. Bank collision detection technique disclosed herein can determine whether values of address bits at a bit-wise region of an effective address associated with a request from one program thread are equal to the values of bits at a corresponding bit-wise region of an effective address associated with a request from a second program thread.

In an embodiment, each of the effective addresses can be determined based on a sum of a base address value and an address offset value. The effective address can be calculated by an execution pipeline associated with each program thread by adding the offset value to the base address. Using the techniques disclosed herein, bank collision can be detected based on the individual base address and address offset values associated with each memory access request. Furthermore, most of the computations required to identify a bank collision can be performed substantially in parallel with a calculation of the corresponding effective addresses. In particular, the bank collision detection logic described below can calculate four speculative collision results based only on the values of address bits included within the applicable bit-wise regions of a base address value and address offset value associated with a request from one program thread and a base address value and address offset value associated with a request from another program thread.

The four results are said to be speculative because an actual carry-in into the least significant bit of the bit-wise region of each effective address, used to select a memory bank, is not yet known. Thus, the four speculative results correspond to the four possible combinations of the value of a carry-in at the bit-wise region of the first effective address and the value of a carry-in at the bit-wise region of the second effective address. For example, a carry-in into the bit-wise region of the first effective address can be either zero or one, and a carry-in into the bit-wise region of the second effective address can be either zero or one. Once the effective addresses associated with each memory access request is calculated and an actual value of the carry-in to the bit-wise region of each effective address is determined, one of the four speculative results can be selected based on the actual carry-in value. If the selected result has a value of a logic true, the bit-wise region of the effective addresses of the two memory request are equivalent, and an indicator identifying a bank match can be asserted. The disclosed techniques are described in detail below with reference to FIGS. 1-8.

While the disclosed techniques are described in the context of detecting a bank collision at a data cache, one skilled in the art will appreciate that the methods and apparatus disclosed herein can be used to identify region collision in other applications. Furthermore, for simplicity, the forgoing description illustrates a bit-wise region that includes three bits, however the disclosed techniques can be applied to regions having a greater or a fewer number of bits.

FIG. 1 is a block diagram illustrating a data processing system 100 according to a specific embodiment of the present disclosure. Data processing system 100 includes a data processor 110 and a memory 120. The data processor 110 includes two processor cores, Core_0, 111, and Core_1, 112, which can have the same or different features. The Processor core 111 includes a pipeline 113, a data cache 115, and a bus interface unit 116. The pipeline 113 includes a collision detect module 114. The processor core 112 can include similar features as processor core 111, and each can include addition modules, omitted from FIG. 1 for clarity. During operation, the data processing device 110, and the processor cores 111 and 112 in particular, can execute instructions to perform a desired function. Furthermore, the pipeline 113 is configured to execute two or more program threads concurrently. Each program thread can access instructions from the memory 120 or from one or more instruction cache memories included at the processor cores 111 and 112 or at the data processor device 110 (not shown at FIG. 1). Each program thread also can store and retrieve data information from one or more data cache memories, such as the data cache 115. In an embodiment, the data cache 115 can include multiple access ports and is thereby generally able to service access requests from two or more program threads simultaneously.

As described above, the internal architecture of the data cache 115 may prevent certain accesses from being serviced in parallel. In an embodiment, the collision detect module 114 is configured to determine whether two access requests are directed at the same memory bank at the data cache 115. The collision detect module is configured to assert a match indicator signal if two accesses are directed to the same bank at the data cache 115. The operation of the collision detect module may be better understood with reference to FIGS. 2-8.

Figure 2:
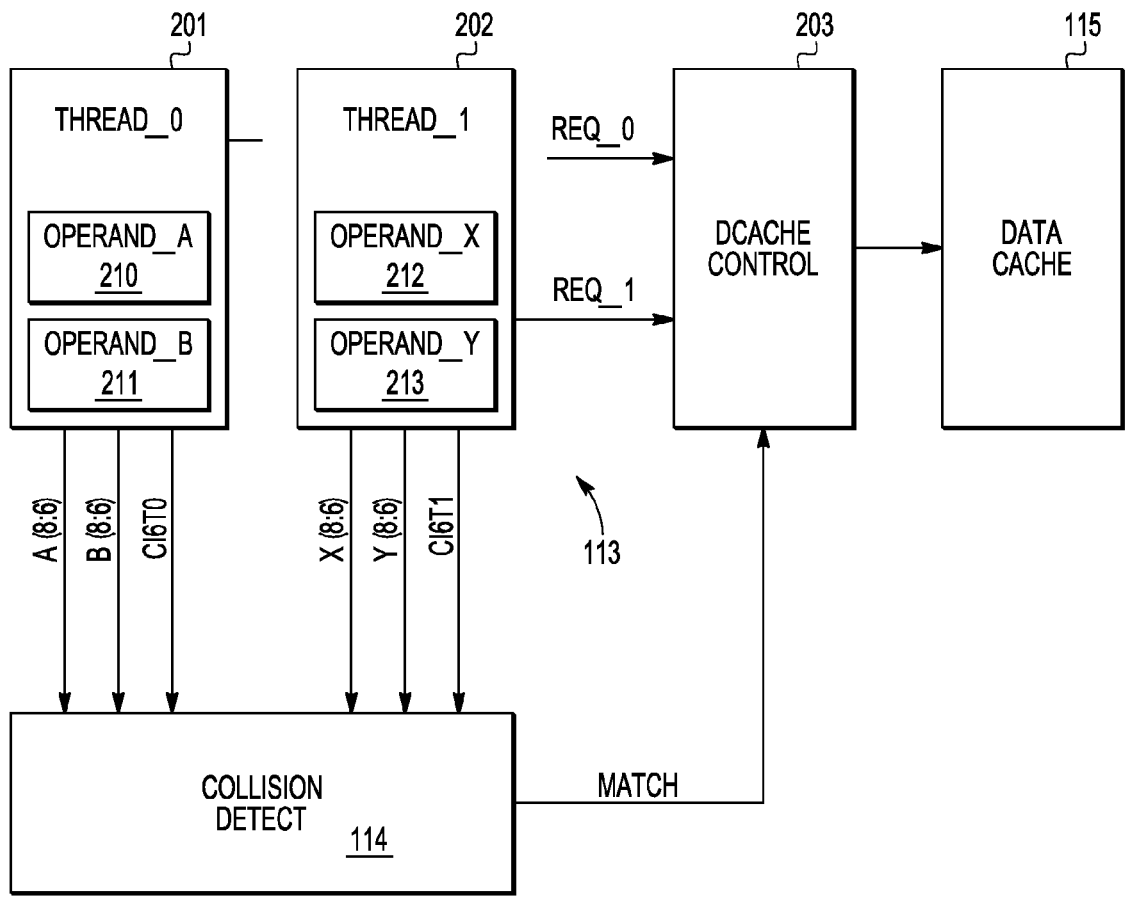
FIG. 2 is a block diagram illustrating the processor core of FIG. 1 according to a specific embodiment of the present disclosure.

FIG. 2 is a block diagram illustrating the processor core 111 of FIG. 1 according to a specific embodiment of the present disclosure. The pipeline 113 is expanded to illustrate pipeline stages 201 operable to execute one program thread, labeled THREAD_0, and pipeline stages 202 operable to execute another program thread, labeled THREAD_1. The processor core 111 includes a data cache control module 203. The data cache control module 203 is configured to receive access requests from Thread 0 and from Thread 1, labeled REQ_0 and REQ_1 respectively, and to initiate and oversee accesses to the data cache 115 to satisfy the requests. Each request includes an effective address identifying a location at the data cache 115 to be accessed and information indicating whether the access is a read operation to retrieve data information from the identified location, or a write operation to store data information at the identified location. The effective address that accompanies each request can be calculated by pipeline stages 201 and 202. For example, the pipeline stages 201 can calculate an effective address associated with REQ_0 by calculating the sum of a base address contained in OPERAND_A 210 and an offset value contained in OPERAND_B 211. Similarly, the pipeline stages 202 can calculate an effective address associated with REQ_1 by calculating the sum of a base address contained in OPERAND_X 212 and an offset value contained in OPERAND_Y 213.

The collision detect module 114 includes an output for providing a signal labeled MATCH. The collision detect module 114 is configured to assert the signal Match if THREAD_0 and THREAD_1 attempt to access the same memory bank at the data cache 115 at the same time. The collision detect module 114 includes a first input for receiving a bit-wise portion of the OPERAND_A, labeled A(8:6), a second input for receiving a corresponding bit-wise portion of the OPERAND_B, labeled B(8:6), and an third input for receiving a signal identifying the value of a carry-in to bit six of the effective address calculated from the OPERAND_A and the OPERAND_B. The collision detect module 114 includes a fourth input for receiving a bit-wise portion of the OPERAND_X, labeled X(8:6), a fifth input for receiving a corresponding bit-wise portion of the OPERAND_Y, labeled Y(8:6), and an sixth input for receiving a signal identifying the value of a carry-in to bit six of the effective address calculated from the OPERAND_X and the OPERAND_Y.

The carry-in signal CI6T0 represents a carry-in into the least significant bit of the bit-wise region that is generated during the addition of OPERAND_A and OPERAND_B to determine an effective address for the THREAD_0. Similarly, the carry-in signal CI6T1 represents a carry-in into the least significant bit of the bit-wise region that is generated during the addition of OPERAND_X and OPERAND_Y to determine an effective address for the THREAD_1. During operation, the collision detect module 114 receives the bit-wise portions of the operands at the same time as pipeline circuitry that adds the operands to determine the effective addresses, and thus the bit-wise portions of the operands are received at the collision detect before the pipeline circuitry has determined the corresponding carry-in signals, CI6T0 and CI6T1. Because the carry-in signals CI6T0 and CI6T1 are not available, the collision detect module 114 generates four speculative results based on the four possible values of the carry-in signals: CI6T0: CI6T1=00, 01, 10, and 11. At a later time, after the carry-in signals are generated by the pipeline 114, the carry-in signal are received at the collision detect module 114. The collision detect module 113 is now able to determine whether the bit-wise portions of the effective addresses of the THREAD_0 and the THREAD_1 match based on the four speculative results and the actual values of the carry-in signals, CI6T0 and CI6T1.

In an embodiment, the data cache 115 may support two simultaneous accesses directed to the same bank of the data cache 115 if both accesses are read-operations. Therefore, a bank collision only occurs when at least one of the accesses is a write-operation. Accordingly, the processor core 111 can include additional logic to further qualify a MATCH indication provided by the collision detect module 114 with information indicating that one or both of the accesses is a write-operation. If either or both accesses are write-operations, a bank-collision is identified, and one of the access requests can be delayed while the other access request is being completed. In another embodiment, simultaneous read accesses at the same memory bank may be prohibited and considered a bank collision. In still another embodiment, simultaneous read accesses to the same bank may be permitted unless the accesses are directed to the same set. In other words, criteria for determining whether simultaneous accesses collide can depend on how the memory is implemented. In an embodiment, the data cache controller 203 is configured to administer data cache accesses and to serialize accesses to prevent a memory bank collision. The data cache 203 has an input to receive the MATCH signal from the collision detect module 114, however other logic modules can be configured to respond to a potential collision condition indicated by the MATCH signal.

Figure 3:
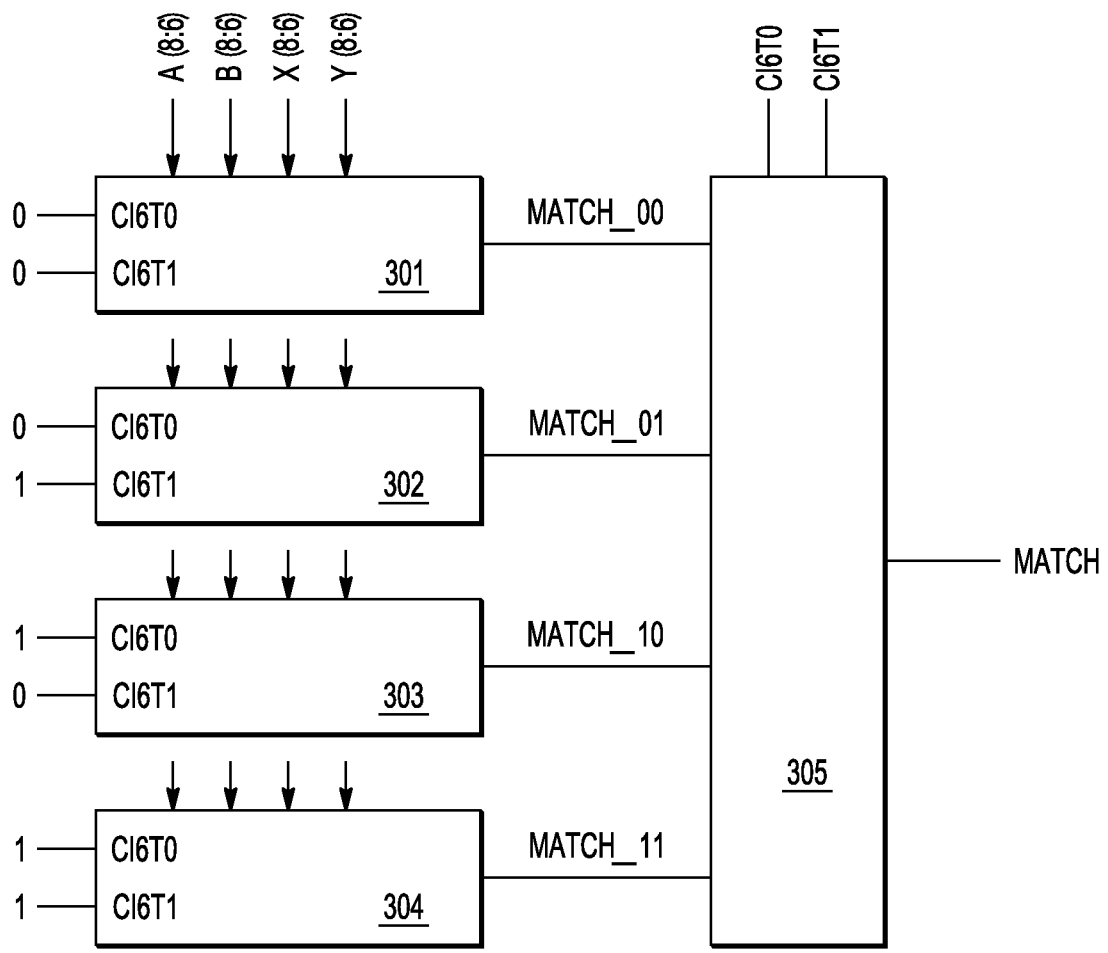
FIG. 3 is a block diagram illustrating the collision detect module of FIGS. 1 and 2 according to a specific embodiment of the present disclosure.

FIG. 3 is a block diagram illustrating the collision detect module 114 of FIGS. 1 and 2 according to a specific embodiment of the present disclosure. The collision detect module 114 includes four speculative result circuits 301, 302, 303, and 304, and a selection circuit 305. Each of the speculative result circuits 301-304 receives portions of the four operands corresponding to the bit-wise region of interest; A(8:6), B(8:6), X(8:6), and Y(8:6). Each of circuits 301-304 is configured to generate a speculative result based on corresponding speculative values of the carry-in signals CI6T0 and CI6T1. For example, the speculative result circuit 301 is configured to determine a speculative result MATCH_00 based on an assumption that the values of the carry-in signals CI6T0 and CI6T1 are both zero. Similarly, the speculative result MATCH_01 is determined by the speculative result circuit 302 based on the assumption that the value of the carry-in signals CI6T0 and CI6T1 are zero and one, respectively. In the same manner, the speculative result MATCH_10 is determined based on assumed carry-in values, one and zero, and the speculative result MATCH_11 is determined based on assumed carry-in values, one and one. The selection circuit 305 is configured to determine a value for the signal MATCH based on the four speculative results and actual values of the carry-in signals CI6T0 and CI6T1 received from the pipeline 113.

During operation, each of the speculative result circuits 301-304 are configured to generate their respective speculative results prior to, or concurrently with, the generation of the actual carry-in signals CI6T0 and CI6T1 by the pipeline 113. Accordingly, by the time that the actual carry-in signals are available at the collision detect module 114, generation of the speculative results can be complete. One skilled in the art will appreciate that various logic implementations and logic optimizations can be utilized to implement circuits 301-305. For example, in one embodiment, the selector circuit 305 can include a simple multiplexor wherein the value of the signal MATCH is determined based on the value of the selected speculative result. In other embodiments, logic optimizations can result in redistribution of logic functions between the speculative result circuits 301-304 and the selector circuit 305. The block diagram at FIG. 4 illustrates an alternate implementation of the disclosed techniques.

Figure 4:
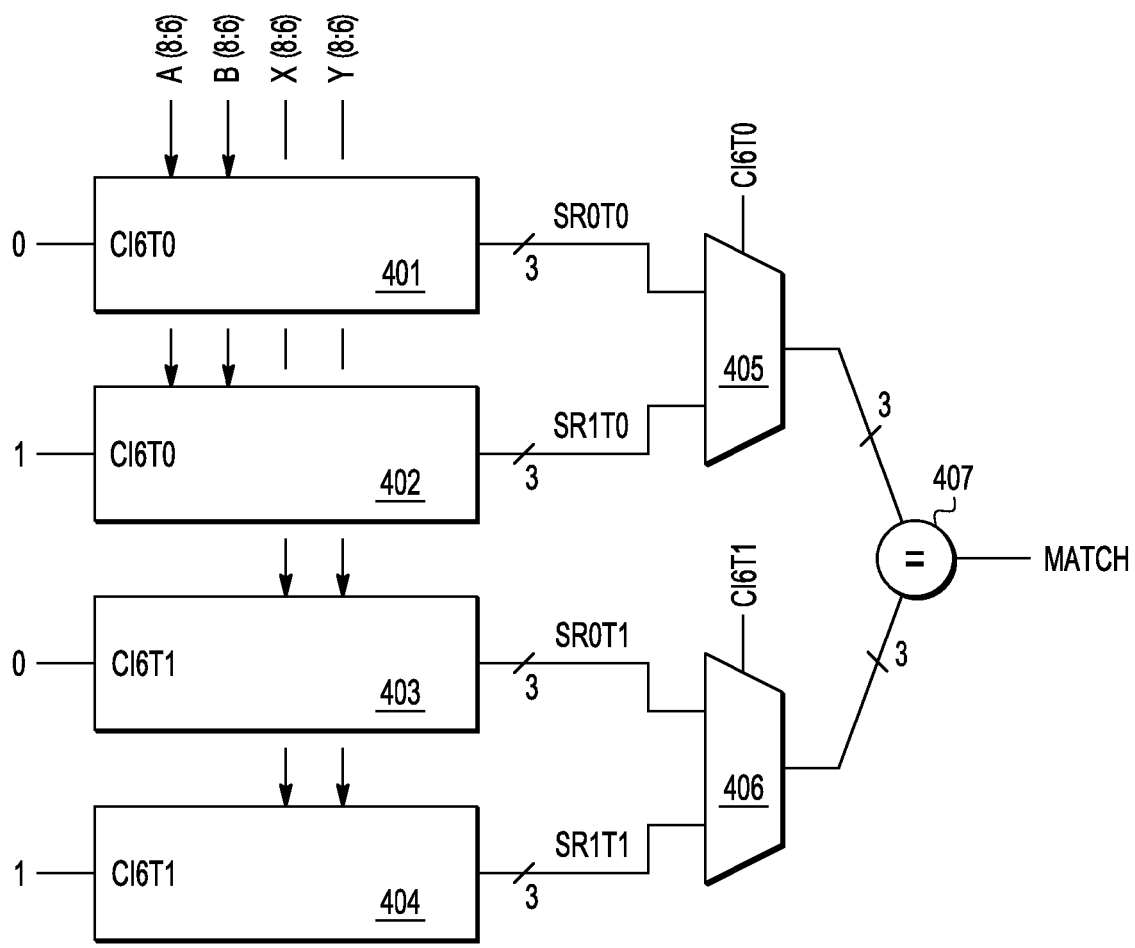
FIG. 4 is a block diagram illustrating the collision detect module of FIGS. 1 and 2 according to another embodiment of the present disclosure.

FIG. 4 is a block diagram illustrating the collision detect module 114 according to another embodiment of the present disclosure. The particular implementation shown at FIG. 4 includes speculative result circuits 401 and 402 associated with the THREAD_0 and speculative result circuits 403 and 404 associated with the THREAD_1. In particular, the speculative result circuit 401 receives A(8:6) and B(8:6) of the THREAD_0 and generates the speculative result SR0T0 assuming that the value of the carry-in into the least significant bit of the bit-wise region will be zero. The speculative result circuit 402 receives A(8:6) and B(8:6) of the THREAD_0 and generates the speculative result SR1T0 assuming that the value of the carry-in into the least significant bit of the bit-wise region will be one. Circuits 403 and 404 are the same as circuits 401 and 402, but generate the speculative results SR0T1 and SR1T1 based on the bit-wise regions of the operands of the THREAD_1, X(8:6) and Y(8:6). The collision detect module 114 also includes selection circuits 405 and 406, and an equivalence circuit 407. During operation, each of the speculative result circuits 401-404 are configured to generate their respective speculative results prior to, or concurrently with, the generation of the actual values of the carry-in signals CI6T0 and CI6T1 by the pipeline 113, similar to the circuit at FIG. 3.

The selector circuit 405 selects the appropriate speculative result associated with the THREAD_0 based on the actual value of CI6T0 and the selector circuit 406 selects the appropriate speculative result associated with the THREAD_1 based on the actual value of CI6T1. For example, if the value of the actual carry-in signal CI6T0 is zero, the selector circuit 405 selects the speculative result SR0T0, and if the value of the actual carry-in signal CI6T0 is one, the selector circuit 405 selects the speculative result SR1T0. In this embodiment, the selector circuits 405 and 406 are selecting and propagating to their outputs three bit values that are equal to the values of the corresponding bit-wise region of the effective addresses calculated by the pipeline 113. The equivalence circuit 407 is configured to perform a bit-wise compare of the value selected by the selector circuit 405 and the value selected by the selector circuit 406. If the values are identical, the equivalence circuit asserts the signal MATCH. For example, if the value selected by the selector circuit 405 is '101' and the value selected by the selector circuit 406 is '101', the signal MATCH is asserted. If the value at any bit-position is not identical, the signal MATCH is not negated.

Figure 5:
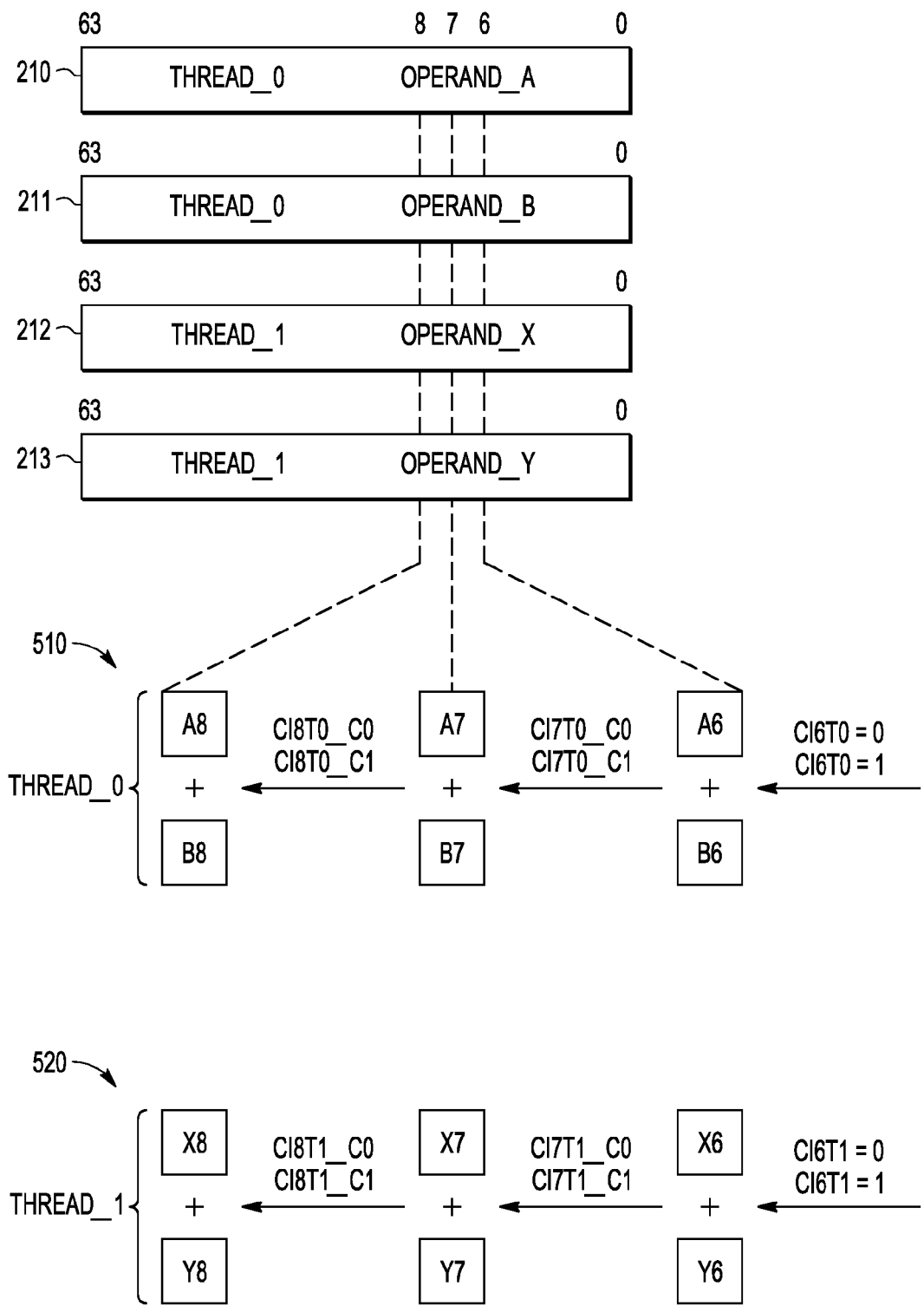
FIG. 5 is a block diagram illustrating a portion of the computations performed by the collision detect module of FIG. 1 and FIG. 2 according to a specific embodiment of the present disclosure.

FIG. 5 is a block diagram 500 illustrating a portion of the computations performed by the collision detect module 114 according to a specific embodiment of the present disclosure. The block diagram 500 includes a representation of operands 210, 211, 212, and 213 of FIG. 2, and in particular, illustrates bit-wise regions A(8:6), B(8:6), X(8:6), and Y(8:6) of the operand values. In an embodiment, the collision detect module 114 includes circuitry for calculating speculative values for carry-in signal from bit position six to bit position seven, and from bit position seven to bit position eight. The speculative carry-in values are determined separately for each program thread, and are determined based on the values of bits within the bit-wise region of the two operands. For example, the reference number 510 illustrates speculative carry-in signals associated with the OPERAND_A and the OPERAND_B of the THREAD_0 and the reference number 520 illustrates speculative carry-in signals associated with the OPERAND_X and the OPERAND_Y of the THREAD_1.

The bit-wise regions are referred to as internal bit-wise regions because the bit-wise region does not include a least-significant bit position of the operand values.

As described above, actual values of a carry-in into bit position six for each thread are not yet known at the time that the speculative results and associated speculative carry-in values are calculated. The signal CI6T0 represents a carry-in into bit position six of the THREAD_0, and the signal CI6T1 represents a carry-in into bit position six of the THREAD_1. These signals are generated by the pipelines stages associated with the execution of each thread at the pipeline 113, and are not used to calculate the speculative carry-in signals. Accordingly, each speculative carry-in value is represented by two values: one value representing a case where a value of a carry-in into the bit-wise region is zero; and another value representing a case where the value of the carry-in into the bit-wise region is one. Accordingly, two speculative results can be calculated associated with the THREAD_0 corresponding to the speculative values of the signal CI6T0, and two speculative results can be calculated associated with the THREAD_1 corresponding to the speculative values of the signal CI6T1. Until the actual value of signals CI6T0 and CI6T1 are received, it is not known which of the speculative results associated with the THREAD_0 and which of the speculative results associated with the THREAD_1 is correct.

Carry-in signals within the bit-wise regions also are not known at this time, and each is represented using two speculative values. For example with reference to THREAD_0, a signal CI7T0_C0 represents a speculative carry-in from bit position six to bit position seven assuming a value of an actual carry-in into bit position six will be zero, and a signal CI7T0_C1 represents a speculative carry-in from bit position six to bit position seven assuming a value of an actual carry-in into bit position six will be one. Similarly, a signal CI8T0_C0 represents a speculative carry-in from bit position seven to bit position eight assuming a value of an actual carry-in into bit position six will be zero, and a signal CI8T0_C1 represents a speculative carry-in from bit position seven to bit position eight assuming a value of an actual carry-in into bit position six will be one. Similarly, speculative carry-in signals CI7T1_C0, CI7T1_C1, CI8T1_C0, and CI8T1_C1 are calculated based on bits of the bit-wise regions of OPERAND_X and OPERAND_Y of the THREAD_1. The operation of the collision detect module may be better understood with reference to FIG. 6. As used herein, signals CI7T0_C0, CI7T0_C1, CI8T0_C0, CI8T0_C1, CI7T1_C0, CI7T1_C1, CI8T1_C0, and CI8T1_C1 are referred to as speculative carry-in signals because they are calculated based on corresponding speculative values of signal CI6T0 and CI6T1. One of skill will appreciate that a speculative carry-in to one bit-position is equivalent to a speculative carry-out from a prior bit-position. For example, the speculative carry-in signal CI7T0 can be referred to as a speculative carry-out from bit-position 6.

Figure 6:
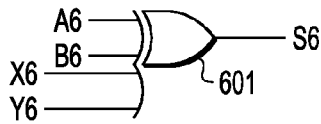
FIG. 6 is a schematic diagram illustrating logic functions to generate the speculative carry-in signals of FIG. 5 according to a specific embodiment of the present disclosure.
Figure 6:
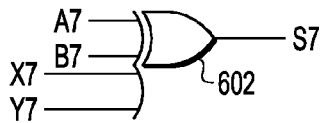
Figure 6:
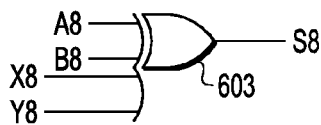
Figure 6:
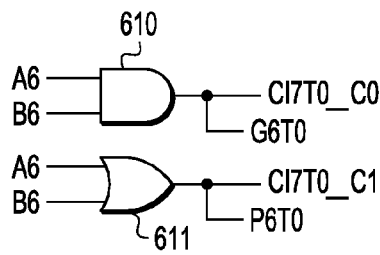
Figure 6:
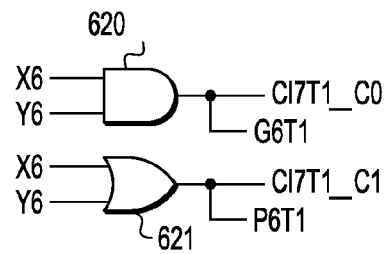
Figure 6:
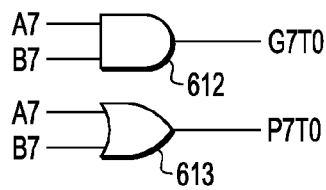
Figure 6:
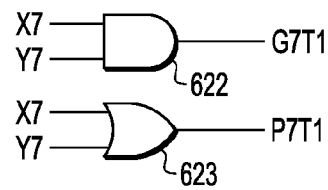
Figure 6:
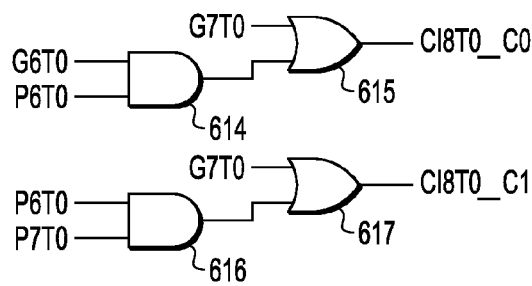
Figure 6:
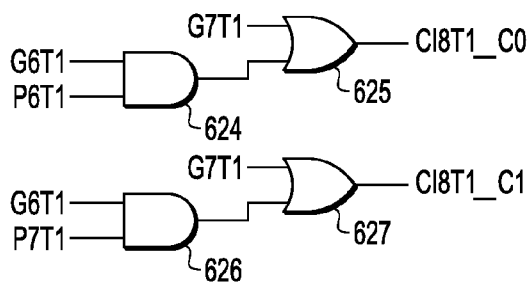

FIG. 6 is a schematic diagram 600 illustrating logic functions to generate the speculative carry-in signals of FIG. 3 according to a specific embodiment of the present disclosure. The schematic diagram 600 also illustrates the generation of signals S6, S7, and S8, each representing a partial sum of bits of each bit position of all four operands. The logic functions and the mathematical principles underlying the computations are based on the equations:

$$A_{thread0} + B_{thread0} = X_{thread1} + Y_{thread1} \quad (1)$$

$$a_{thread0i} \oplus b_{thread0i} \oplus c^{in}_{thread0i} = x_{thread1i} \oplus y_{thread1i} \oplus c^{in}_{thread1i} \quad (2)$$

$$a_{thread0i} \oplus b_{thread0i} \oplus x_{thread1i} \oplus y_{thread1i} = c^{in}_{thread1i} \oplus c^{in}_{thread0i} \quad (3)$$

Where, equation (1) sets forth the conditions that establish a match and possible collision, and the values A, B, X, and Y can refer to operands A and B of the THREAD_0, and operands X and Y of the THREAD_1 in their entirety or to the specific bit-wise region for which it is desired to identify a match; bits six, seven, and eight in the present example. The equations (2) and (3) are derived from equation (1) by mathematical transformation to yield the relationship at (3) that the exclusive-OR of the operands is equal to the exclusive-OR of the carry-in for each bit position, denoted as (i). For the present example, (i) corresponds to each bit position of the bit-wise region and has a value of six, seven, and eight. All of the values in equation (3) are known except for the value of the carry-in into the least significant bit position of the bit-wise regions associated with the THREAD_0 and of THREAD_1. The possible values for a carry-in for THREAD_0 are zero and one, and the possible values of a carry-in for THREAD_1 are zero and one. Therefore, the collision detect module 114 is configured to calculate four speculative results based on the four possible combinations of the two carry-in values. The logic functions described below with reference to FIGS. 6 and 7 implement equation (3) to generate four speculative results. The correct result is selected based on the arrival of the actual values of the carry-in into the least significant bit position of the bit-wise regions corresponding to THREAD_0 and of THREAD_1.

Signals S6, S7, and S8 are each generated by exclusive-OR gates 601, 602, and 603, respectively. The logic gate 601 generates the signal S6 based on the values of bit(6) of Operands A, B, X, and Y. Similarly, the logic gate 602 generates signal S7 based on the values of bit(7) of each operand, and the gate logic 603 generates signal S8 based on the values of bit(8) of each operand. As described above with reference to equations (2) and (3), the signals S6, S7, and S8 represent bit-wise partial sums. Any carry-out signals, either generated at a particular bit position or propagated from a prior bit position are generated separately. For example, logic gates 610-617 are configured to generate speculative carry-in signals CI7T0_C0, CI7T0_C1, CI8T0_C0, and CI8T0_C1.

The speculative carry-in signal CI7T0_C0 corresponds to the carry-out of bit position six for THREAD_0 in the event that the value of a actual carry-in into bit position six will be zero. The signal CI7T0_C0 is logically equal to a carry-generate, G6T0 determined by a logical-AND of OPERAND_A(6) and OPERAND_B(6), generated by the logic gate 610. If the carry-in into bit position six is a zero, the only way for there to be a carry-out from bit position six is if the carry is generated based on the value of A(6) and B(6). The speculative carry-in signal CI7T1_C1 corresponds to the carry-out of bit position six for THREAD_0 in the event that the value of an actual carry-in into bit position six will be one. The signal CI7T1_C1 is logically equal to a carry-propagate at the bit position six, determined by a logical-OR of OPERAND_A(6) and OPERAND_B(6), signal P6T0 generated by the logic gate 611. A carry-out of bit position six will occur if a carry-in into the bit position six is a one and the value of at least one of bits A(6) and B(6) is a one.

The speculative carry-in signal CI8T0_C0 corresponds to the carry-out of bit position seven for THREAD_0 in the event that the actual value of the carry-in into bit position six will be zero. The signal CI8T0_C0 is provided by the logic gates 614 and 615 and is true if a carry is generated at bit position seven, signal G7T0 generated by the logic gate 612, or if a carry is generated at bit position six, signal G6T0, and also propagated at the bit position six, signal P6T0 provided by the logic gate 611. The speculative carry-in signal CI8T0_C1 corresponds to the carry-out of bit position seven for THREAD_0 in the event that the actual value of the carry-in into bit position six will be one. The signal CI8T0_C1 is provided by the logic gates 616 and 617 and is true if a carry is generated at bit position seven, signal G7T0, or if a carry is propagated at bit position six, signal P6T0, and also propagated at the bit position seven, signal P67T0 provided by the logic gate 613. The speculative carry-in signals associated with the THREAD_1, CI7T1_C0, CI7T1_C1, CI8T1_C0, and CI8T1_C1, are provided by logic gates 620-627 similarly to the speculative carry-in signals for the THREAD_0 described above, except that bits from the bit-wise region of the Operands X and Y are used instead of those of the Operands A and B.

Figure 7:
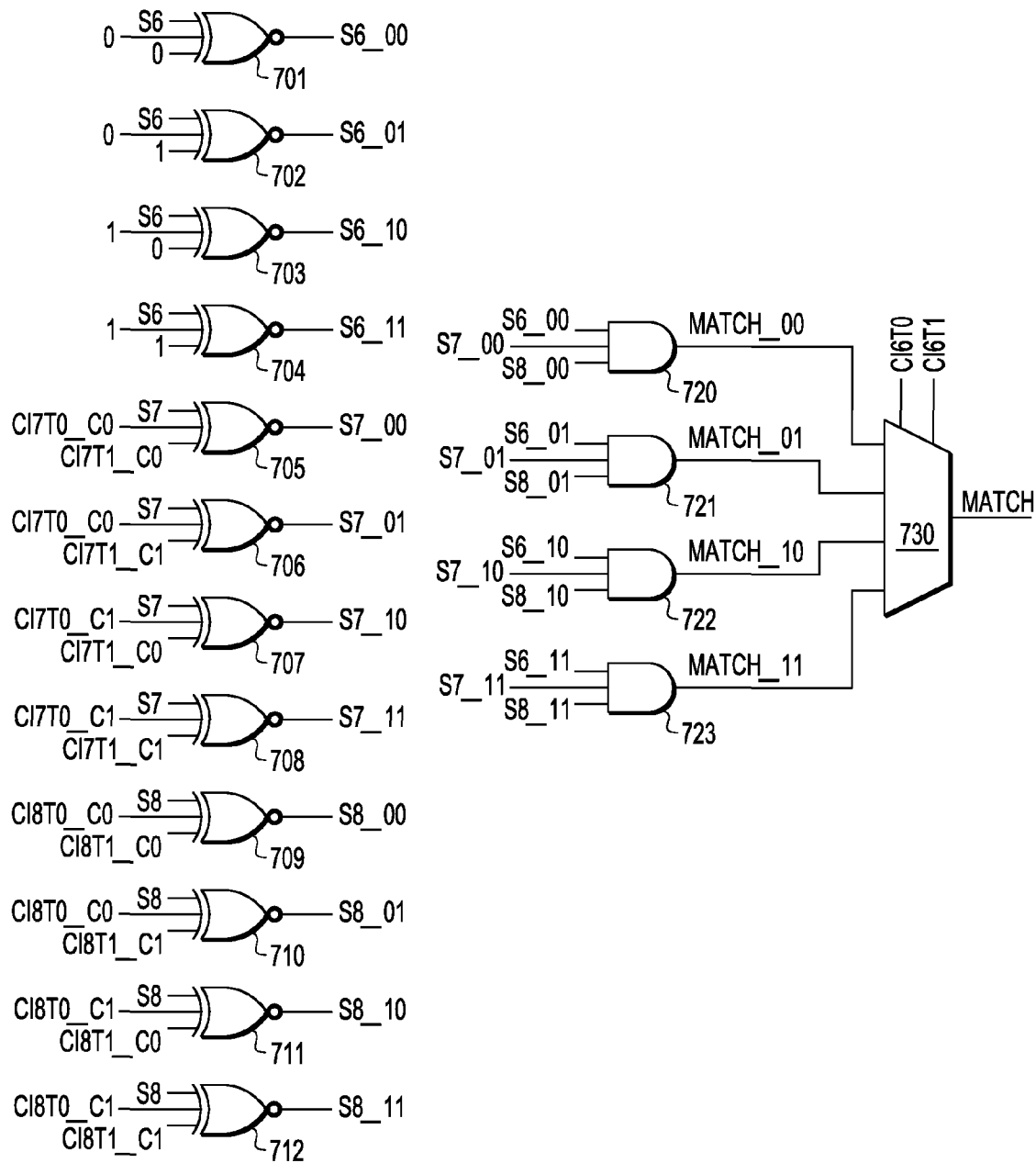
FIG. 7 is a schematic diagram illustrating logic functions to generate the MATCH signal of FIG. 2 according to a specific embodiment of the present disclosure.

FIG. 7 is a schematic diagram 700 illustrating logic functions to generate the Match signal of FIG. 2 according to a specific embodiment of the present disclosure. The schematic diagram 700 includes twelve exclusive-NOR logic gates 701-712 and AND logic gates 720-723 that together generate four speculative match signals, MATCH_00, MATCH_01, MATCH_10, and MATCH_11. For example, an assertion of the signal MATCH_00 indicates that the particular bit-wise region of the effective address associated with the THREAD_0 is equal to the corresponding bit-wise region of the effective address associated with the THREAD_1 if the carry-in into the least significant bit of the bit-wise region of the effective address of THREAD_0 is a zero and the carry-in into the least significant bit of the bit-wise region of the effective address of THREAD_1 is a zero. While exclusive-NOR gates 701-704 are illustrated for clarity, it will be appreciated that the logic functions to provide the signals S6_00, S6_01, S6_10, and S6_11 can be reduced, since the values of the carry-in into the least significant bit position are simply logic-zero and logic-one values.

The signal MATCH_00 is generated by the AND gate 720 and the exclusive-NOR gates 701, 705, and 709. In particular, the assertion of the signal S7_00 generated by the exclusive-NOR gate 705 indicates that bits A(7), B(7), X(7), and Y(7) are all equal and signals CI7T0 and CI7T1 are both equal to zero. The signal MATCH_00 is asserted if a similar condition exists at all three bits of the bit-wise region. The signals S6_00 through S8_11 are generated similarly, the nomenclature identifying the bit position within the bit-wise region and the respective speculative values of the carry-in into the least significant bit position of the bit-wise region for the THREAD_0 and the THREAD_1. For example, the signal S8_11 indicates that bits A(8), B(8), X(8), and Y(8) are all equal and signals CI8T0 and CI8T1 are both equal to one.

An assertion of the signal MATCH_01 indicates the regions of the effective addresses are equal if the carry-in into the least significant bit of the bit-wise region of the effective address of THREAD_0 is a zero and the carry-in into the least significant bit of the bit-wise region of the effective address of THREAD_1 is a one. Similarly, the signal MATCH_10 corresponds to the case where the carry-in into the least significant bit of the bit-wise region of the effective address of THREAD_0 is a one and the carry-in into the least significant bit of the bit-wise region of the effective address of THREAD_1 is a zero, and the signal MATCH_11 corresponds to the case where the carry-in into the least significant bit of the bit-wise region of the effective address of THREAD_0 is a one and the carry-in into the least significant bit of the bit-wise region of the effective address of THREAD_1 is a one.

The signal MATCH is generated by selecting one of the four signals MATCH_00, MATCH_01, MATCH_10, and MATCH_11 based on the actual value of the carry-in received at the least significant bit position of the bit-wise regions of the THREAD_0, CI6T0, and the corresponding carry-in signal of the THREAD_1, CI6T1, during the calculation of the complete effective addresses for each thread. For example, if the actual value of the carry-in into bit(6) during the calculation of the effective address for THREAD_0 is a one, and the actual value of the carry-in into bit(6) during the calculation of the effective address for THREAD_1 is a one, the multiplexor 730 selects the signal MATCH_11, and the value of the signal MATCH is set to the value of the signal MATCH_11. One skilled in the art will appreciate that the logic functions shown at FIGS. 6 and 7 represent only one if many ways to implement the techniques disclosed herein.

Figure 8:
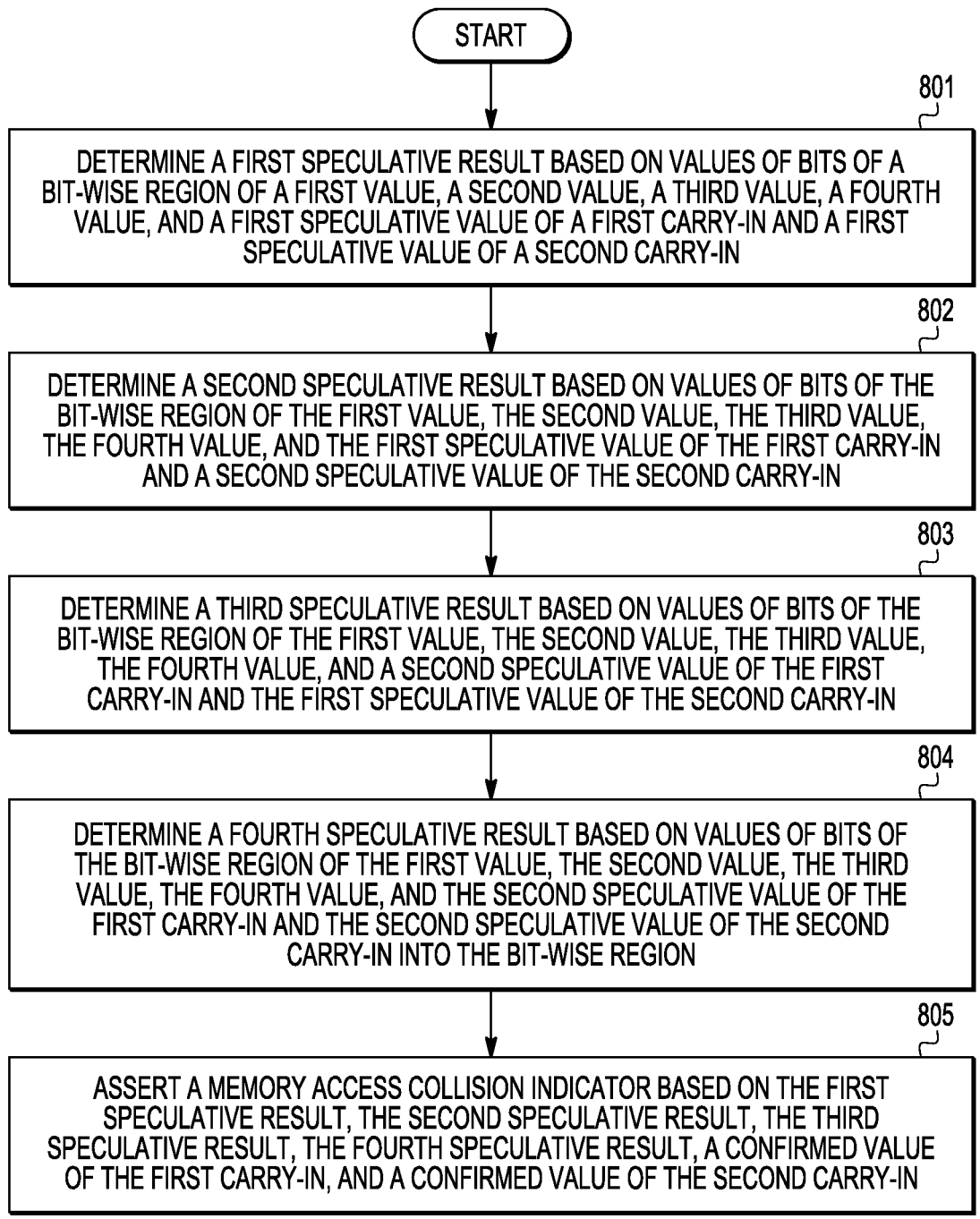
FIG. 8 is a flow diagram illustrating a method according to a specific embodiment of the present disclosure.

FIG. 8 is a flow diagram illustrating a method 800 according to a specific embodiment of the present disclosure. The method 800 begins at block 801 where a first speculative result is determined based on values of bits of a bit-wise region of a first value, a second value, a third value, a fourth value, and a first speculative value of a first carry-in and a first speculative value of a second carry-in. For example, the speculative result circuit 301 of FIG. 3 is configured to determine a value of the speculative result MATCH_00 based on the values of A(8:6), B(8:6), X(8:6), and Y(8:6), assuming the value of the speculative carry-in CI6T0 into the bit-wise region corresponding to the THREAD_0 is zero, and the speculative carry-in CI6T1 into the bit-wise region corresponding to the THREAD_1 is also zero.

The method continues at block 802 where a second speculative result is determined based on values of bits of the bit-wise region of the first value, the second value, the third value, the fourth value, and the first speculative value of the first carry-in and a second speculative value of the second carry-in. For example, the speculative result circuit 302 of FIG. 3 is configured to determine a value of the speculative result MATCH_01 based on the same four values provided to the circuit 301, but assuming the value of the speculative carry-in CI6T0 into the bit-wise region corresponding to the THREAD_0 is zero, and the speculative carry-in CI6T1 into the bit-wise region corresponding to the THREAD_1 is one.

The method continues at block 803 where a third speculative result is determined based on values of bits of the bit-wise region of the first value, the second value, the third value, the fourth value, and a second speculative value of the first carry-in and the first speculative value of the second carry-in. For example, the speculative result circuit 303 of FIG. 3 is configured to determine a value of the speculative result MATCH_10 based on the same four values provided to the circuit 301, but assuming the value of the speculative carry-in CI6T0 into the bit-wise region corresponding to the THREAD_0 is one, and the speculative carry-in CI6T1 into the bit-wise region corresponding to the THREAD_1 is zero.

The method continues at block 804 where a fourth speculative result is determined based on values of bits of the bit-wise region of the first value, the second value, the third value, the fourth value, and the second speculative value of the first carry-in and the second speculative value of the second carry-in into the bit-wise region. For example, the speculative result circuit 304 of FIG. 3 is configured to determine a value of the speculative result MATCH_11 based on the same four values provided to the circuit 301, but assuming the value of the speculative carry-in CI6T0 into the bit-wise region corresponding to the THREAD_0 is one, and the speculative carry-in CI6T1 into the bit-wise region corresponding to the THREAD_1 is also one.

The method continues at block 805 where a memory access collision indicator is asserted based on the first speculative result, the second speculative result, the third speculative result, the fourth speculative result, an actual value of the first carry-in, and an actual value of the second carry-in. For example, the selection circuit 305 is configured to determine a value for the signal MATCH based on the four speculative results and actual values of the carry-in signals CI6T0 and CI6T1.

Figure 9:
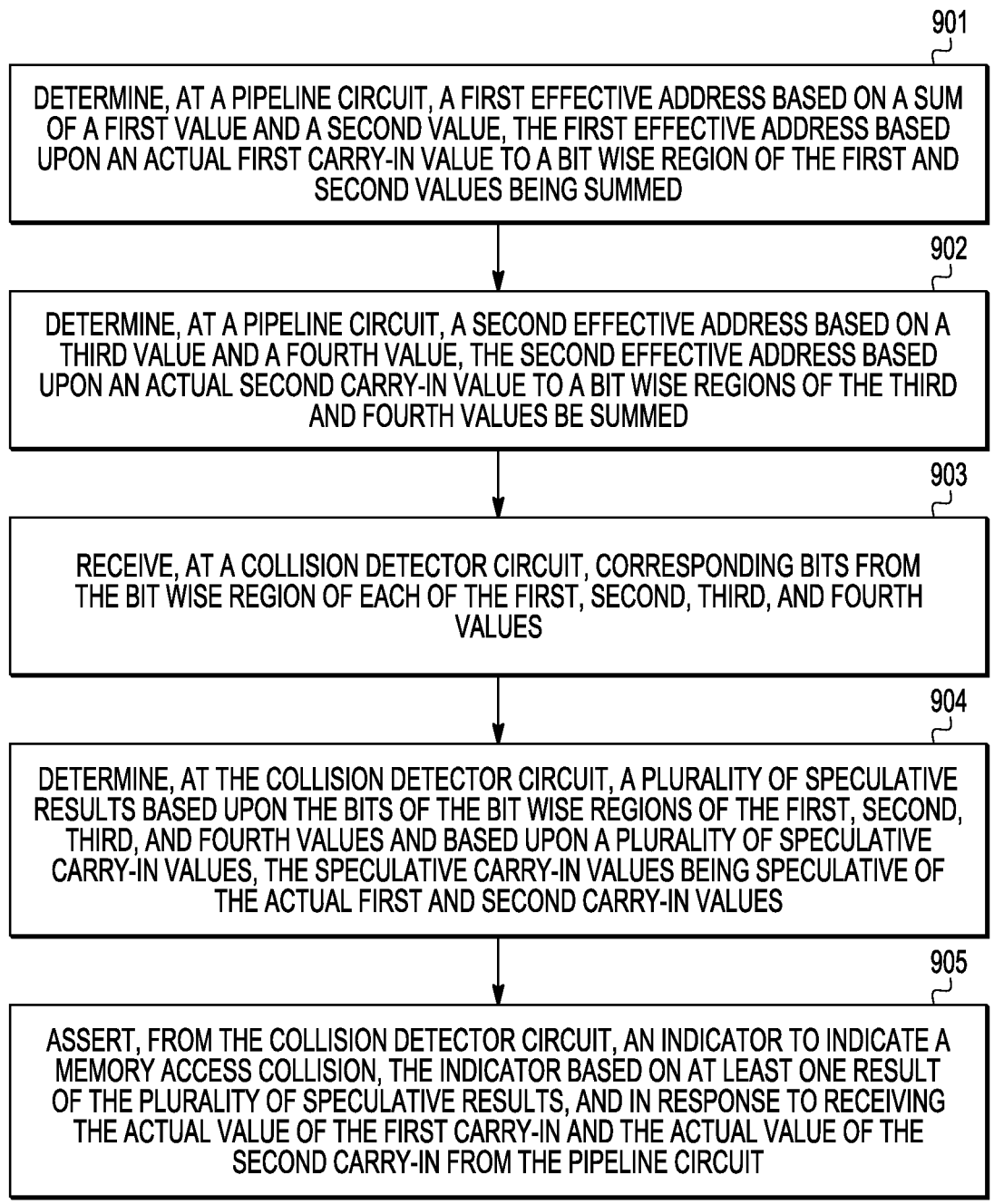
FIG. 9 is a flow diagram illustrating a method according to a specific embodiment of the present disclosure.

FIG. 9 is a flow diagram illustrating a method 900 according to a specific embodiment of the present disclosure. The method 900 begins at block 901 where a sum of a first value and a second value is determined at a pipeline circuit to determine a first effective address, wherein the sum of the first and second value results in an actual first carry-in to a defined bit-wise region of the values being summed. For example, with reference to FIG. 2, the request REQ_0 provided by the pipeline stages 201 and associated with the THREAD_0 includes the first effective address identifying a location at the data cache 115. The method continues at block 902 wherein a sum of a third value and a fourth value is determined at a pipeline circuit to determine a second effective address, wherein the sum of the first and second value results in an actual second carry-in to a defined bit-wise region of the values being summed. For example, the request REQ_1 provided by the pipeline stages 202 and associated with the THREAD_1 includes the second effective address identifying another location at the data cache 115.

The method continues at block 903 where corresponding bits from the bit-wise region of each of the first, second, third, and fourth values are received at a collision detector circuit. For example, the collision detect circuit 114 of FIG. 2 receives bit-wise portions of OPERAND_A, OPERAND_B, OPERAND_X, and OPERAND_Y. The method continues at block 904 where a plurality of speculative results based upon the bits of the bit-wise regions of the first, second, third, and fourth values and based upon a plurality of speculative carry-in values is determined at the collision detector circuit, wherein the speculative carry-in values are speculative of the actual first and second carry-in values. For example, referring to FIG. 5, a carry-in into the least significant bit position of the bit-wise region of the values associated with THREAD_0, CI6T0 can be assigned a speculative value of zero or a speculative value of one. The method continues at block 905 where a memory access collision indicator is asserted based on at least one result of the plurality of the plurality of speculative results, and in response to receiving the actual values of the first and second carry-ins from the pipeline circuit. For example, multiplexor 703 of FIG. 7 selects one of the signals MATCH_00, MATCH_01, MATCH_10, and MATCH_11 based on an actual value of the carry-in signals, CI6T0 and CI6T1.

In a first aspect, a method includes determining at a pipeline circuit, a first effective address based a sum of a first value and a second value, the first effective address based upon an actual value of a first carry-in into a bit-wise region of the first and second values, wherein the bit-wise region includes a predefined internal region of bits of the first and second values; determining at the pipeline circuit, a second effective address based a sum of a third value and a fourth value, the second effective address based upon an actual value of a second carry-in into the bit-wise region of the third and fourth values; receiving, at a collision detector circuit, corresponding bits from the bit-wise region of each of the first, second, third, and fourth values; determining a plurality of speculative results based upon the bits of the bit-wise regions of the first, second, third, and fourth values and based upon a plurality of speculative carry-in values, the speculative carry-in values being speculative of the actual first and second carry-in values; and asserting an indicator to indicate a memory access collision, the indicator based on at least one result of the plurality of speculative results, and in response to receiving the actual value of the first carry-in and the actual value of the second carry-in from the pipeline circuit.

In a second aspect, a method includes determining at a pipeline circuit a first effective address based on a first value and a second value to provide; determining at the pipeline circuit a second effective address based on a third value and a fourth value; determining at a collision detect circuit a first speculative result based on values of bits of a bit-wise region of a first value, a second value, a third value, a fourth value, and a first speculative value of a first carry-in and a first speculative value of a second carry-in; determining a second speculative result based on values of bits of the bit-wise region of the first value, the second value, the third value, the fourth value, and the first speculative value of the first carry-in and a second speculative value of the second carry-in; determining a third speculative result based on values of bits of the bit-wise region of the first value, the second value, the third value, the fourth value, and a second speculative value of the first carry-in and the first speculative value of the second carry-in; determining a fourth speculative result based on values of bits of the bit-wise region of the first value, the second value, the third value, the fourth value, and the second speculative value of the first carry-in and the second speculative value of the second carry-in into the bit-wise region; and asserting a memory access collision indicator based on the first speculative result, the second speculative result, the third speculative result, and the fourth speculative result, in response to receiving an actual value of the first carry-in, and an actual value of the second carry-in from the pipeline circuit.

In one embodiment of the second aspect, asserting the indicator further includes determining values at bits of the bit-wise region of a sum of the first value and the second value are equal to values of corresponding bits of the bit-wise region of a sum of the third value and the fourth value. In another embodiment of the second aspect, asserting the indicator further includes determining two memory access requests will collide. In another embodiment of the second aspect, determining the first speculative result further includes determining a value of a first speculative carry-out of a first bit position of the bit-wise region. In another embodiment of the second aspect, the first value represents a base address and the second value represents an address offset, a sum of the first value and the second value to provide an effective address associated with a memory access request corresponding to a location at a memory device. In another embodiment of the second aspect, the first, second, third, and fourth results are determined concurrently with a determination of the actual value of the first carry-in. In another embodiment of the second aspect, the first actual value of the carry-in is determined during a calculation of the first effective address.

In a third aspect, a method includes determining at a pipeline circuit a first effective address based on a first value and a second value to provide; determining at the pipeline circuit a second effective address based on a third value and a fourth value; determining at a collision detect circuit a first speculative result based on values of bits of a bit-wise region of a first value, values of bits of the bit-wise region of a second value, and a first speculative value of a first carry-in into the bit-wise region; determining a second speculative result based on the values of bits of the bit-wise region of the first value, the values of bits of the bit-wise region of the second value, and a second speculative value of the first carry-in into the bit-wise region; determining a third speculative result based on values of bits of the bit-wise region of a third value, values of bits of the bit-wise region of a fourth value, and a first speculative value of a second carry-in into the corresponding bit-wise region; determining a fourth speculative result based on the values of bits of the bit-wise region of the third value, the values of bits of the bit-wise region of the fourth value, and a second speculative value of the second carry-in into the corresponding bit-wise region; and asserting a memory access collision indicator based on the first speculative result, the second speculative result, the third speculative result, and the fourth speculative result, in response to receiving an actual value of the first carry-in and an actual value of the second carry-in from the pipeline circuit.

In one embodiment of the third aspect, asserting the indicator further includes asserting the indicator in response to: selecting one of the first and second speculative results based on the actual value of the first carry-in to provide a first confirmed result; selecting one of the third and fourth speculative results based on the actual value of the second carry-in to provide a second confirmed result; and asserting the indicator based on the first confirmed result and the second confirmed result. In another embodiment of the third aspect, asserting the indicator further includes determining values at bits of the bit-wise region of a sum of the first value and the second value are equal to values of corresponding bits of the bit-wise region of a sum of the third value and the fourth value. In another embodiment of the third aspect, determining the first speculative result further includes determining a value of a first speculative carry-out of a first bit position of the bit-wise region. In another embodiment of the third aspect, asserting the indicator further includes determining two memory access requests will collide. In another embodiment of the third aspect, the first value represents a base address and the second value represents an address offset, a sum of the first value and the second value to provide an effective address associated with a memory access request corresponding to a location at a memory device. In another embodiment of the third aspect, the first, second, third, and fourth results are determined concurrently with a determination of the actual value of the first carry-in. In another embodiment of the third aspect, the first actual carry-in value is determined by a calculation of the first effective address.

In a third aspect, a data processing device includes two circuits. The first circuit determines a first speculative result based on values of bits of a bit-wise region of a first value, a second value, a third value, a fourth value, and a first speculative value of a first carry-in and a first speculative value of a second carry-in. The first circuit also determines a second speculative result based on values of bits of the bit-wise region of the first value, the second value, the third value, the fourth value, and the first speculative value of the first carry-in and a second speculative value of the second carry-in. The first circuit also determines a third speculative result based on values of bits of the bit-wise region of the first value, the second value, the third value, the fourth value, and a second speculative value of the first carry-in and the first speculative value of the second carry-in. The first circuit also determines a fourth speculative result based on values of bits of the bit-wise region of the first value, the second value, the third value, the fourth value, and the second speculative value of the first carry-in and the second speculative value of the second carry-in into the bit-wise region. The first circuit asserts an indicator indicating values of bits of the bit-wise region of a sum of the first value and the second value are equal to values of corresponding bits of the bit-wise region of a sum of the third value and the fourth value based on the first speculative result, the second speculative result, the third speculative result, and the fourth speculative result, in response to receiving an actual value of the first carry-in and an actual value of the second carry-in.

In one embodiment of the third aspect the first circuit further determines the first speculative result based on a value of a first speculative carry-out of a first bit position of the bit-wise region. In another embodiment of the third aspect, asserting the indicator further includes determining two memory access requests will collide. In another embodiment of the third aspect, asserting the indicator further includes determining two memory access requests seek to access the same bank of a memory. In another embodiment of the third aspect, the first value represents a base address and the second value represents an address offset, a sum of the first value and the second value to provide an effective address associated with a memory access request corresponding to a location at a memory device.

Those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method comprising:
   determining at a pipeline circuit, a first effective address based a sum of a first value and a second value, the first effective address based upon an actual value of a first carry-in into a bit-wise region of the first and second values, wherein the bit-wise region includes a predefined internal region of bits of the first and second values;
   determining at the pipeline circuit, a second effective address based a sum of a third value and a fourth value, the second effective address based upon an actual value of a second carry-in into the bit-wise region of the third and fourth values;
   receiving, at a collision detector circuit, corresponding bits from the bit-wise region of each of the first, second, third, and fourth values;
   determining a plurality of speculative results based upon the bits of the bit-wise regions of the first, second, third, and fourth values and based upon a plurality of speculative carry-in values, the speculative carry-in values being speculative of the actual first and second carry-in values; and
   asserting an indicator to indicate a memory access collision, the indicator based on at least one result of the plurality of speculative results, and in response to receiving the actual value of the first carry-in and the actual value of the second carry-in from the pipeline circuit.

2. The method of claim 1, wherein determining the plurality of speculative results further comprises:
   determining a first speculative result based on values of bits of the bit-wise region of the first value, the second value, the third value, the fourth value, and a first speculative value of the first carry-in and a first speculative value of the second carry-in;

determining a second speculative result based on values of bits of the bit-wise region of the first value, the second value, the third value, the fourth value, and the first speculative value of the first carry-in and a second speculative value of the second carry-in;

determining a third speculative result based on values of bits of the bit-wise region of the first value, the second value, the third value, the fourth value, and a second speculative value of the first carry-in and the first speculative value of the second carry-in; and determining a fourth speculative result based on values of bits of the bit-wise region of the first value, the second value, the third value, the fourth value, and the second speculative value of the first carry-in and the second speculative value of the second carry-in into the bit-wise region.

3. The method of claim 1, wherein determining the plurality of speculative results further comprises:

determining a first speculative result based on values of bits of the bit-wise region of the first value, values of bits of the bit-wise region of the second value, and a first speculative value of the first carry-in into the bit-wise region;

determining a second speculative result based on the values of bits of the bit-wise region of the first value, the values of bits of the bit-wise region of the second value, and a second speculative value of the first carry-in into the bit-wise region;

determining a third speculative result based on values of bits of the bit-wise region of a third value, values of bits of the bit-wise region of a fourth value, and a first speculative value of a second carry-in into the corresponding bit-wise region; and determining a fourth speculative result based on the values of bits of the bit-wise region of the third value, the values of bits of the bit-wise region of the fourth value, and a second speculative value of the second carry-in into the corresponding bit-wise region.

4. The method of claim 1, wherein asserting the indicator further comprises determining values at bits of the bit-wise region of the sum of the first value and the second value are equal to values of corresponding bits of the bit-wise region of the sum of the third value and the fourth value.

5. The method of claim 1, wherein asserting the indicator further comprises determining two memory access requests will collide.

6. The method of claim 1, wherein determining the first speculative result further comprises determining a value of a first speculative carry-out of a first bit position of the bit-wise region.

7. The method of claim 1, wherein the first value represents a base address and the second value represents an address offset, the first effective address associated with a first memory access request of a first program thread and corresponding to a location at a memory device, and wherein the third value represents a base address and the fourth value represents an address offset, the second effective address associated with a second memory access request of a second program thread and corresponding to another location at the memory device.

8. The method of claim 1, wherein the first, second, third, and fourth speculative results are determined concurrently with a determination of the actual values of the first carry-in and the second carry-in.

9. The method of claim 1, wherein the actual value of the first carry-in is determined during a calculation of the first effective address and the actual value of the second carry-in is determined during a calculation of the second effective address.

10. A data processing device comprising:

a pipeline circuit to:
determine a first effective address based a sum of a first value and a second value, the first effective address based upon an actual value of a first carry-in into a bit-wise region of the first and second values, wherein the bit-wise region includes a predefined internal region of bits of the first and second values; and determine a second effective address based a sum of a third value and a fourth value, the second effective address based upon an actual value of a second carry-in into the bit-wise region of the third and fourth values; and a collision detector circuit coupled to the pipeline circuit to:
receive corresponding bits from the bit-wise region of each of the first, second, third, and fourth values;

determine a plurality of speculative results based upon the bits of the bit-wise regions of the first, second, third, and fourth values and based upon a plurality of speculative carry-in values, the speculative carry-in values being speculative of the actual first and second carry-in values; and assert an indicator to indicate a memory access collision, the indicator based on at least one result of the plurality of speculative results, and in response to receiving the actual value of the first carry-in and the actual value of the second carry-in from the pipeline circuit.

11. The data processing device of claim 10, wherein determining the plurality of speculative results further comprises:

determining a first speculative result based on values of bits of the bit-wise region of the first value, the second value, the third value, the fourth value, and a first speculative value of the first carry-in and a first speculative value of the second carry-in;

determining a second speculative result based on values of bits of the bit-wise region of the first value, the second value, the third value, the fourth value, and the first speculative value of the first carry-in and a second speculative value of the second carry-in;

determining a third speculative result based on values of bits of the bit-wise region of the first value, the second value, the third value, the fourth value, and a second speculative value of the first carry-in and the first speculative value of the second carry-in; and determining a fourth speculative result based on values of bits of the bit-wise region of the first value, the second value, the third value, the fourth value, and the second speculative value of the first carry-in and the second speculative value of the second carry-in into the bit-wise region.

12. The data processing device of claim 10, wherein determining the plurality of speculative results further comprises:

determining a first speculative result based on values of bits of the bit-wise region of the first value, values of bits of the bit-wise region of the second value, and a first speculative value of the first carry-in into the bit-wise region;

determining a second speculative result based on the values of bits of the bit-wise region of the first value, the values of bits of the bit-wise region of the second value, and a second speculative value of the first carry-in into the bit-wise region;

determining a third speculative result based on values of bits of the bit-wise region of a third value, values of bits of the bit-wise region of a fourth value, and a first speculative value of a second carry-in into the corresponding bit-wise region; and determining a fourth speculative result based on the values of bits of the bit-wise region of the third value, the values of bits of the bit-wise region of the fourth value, and a second speculative value of the second carry-in into the corresponding bit-wise region.

13. The data processing device of claim 10, wherein asserting the indicator further comprises determining values at bits of the bit-wise region of the sum of the first value and the second value are equal to values of corresponding bits of the bit-wise region of the sum of the third value and the fourth value.

14. The data processing device of claim 10, wherein asserting the indicator further comprises determining two memory access requests will collide.

15. The data processing device of claim 10, wherein determining the first speculative result further comprises determining a value of a first speculative carry-out of a first bit position of the bit-wise region.

16. The data processing device of claim 10, wherein the first value represents a base address and the second value represents an address offset, the first effective address associated with a first memory access request of a first program thread and corresponding to a location at a memory device, and wherein the third value represents a base address and the fourth value represents an address offset, the second effective address associated with a second memory access request of a second program thread and corresponding to another location at the memory device.

17. The data processing device of claim 10, wherein the first, second, third, and fourth speculative results are determined concurrently with a determination of the actual values of the first carry-in and the second carry-in.

18. A method comprising:
determining at a first circuit a first sum of a first value and a second value, the first sum based upon an actual value of a first carry-in into a bit-wise region of the first and second values, wherein the bit-wise region includes a predefined internal region of bits of the first and second values;

determining at the first circuit a second sum of a third value and a fourth value, the second sum based upon an actual value of a second carry-in into the bit-wise region of the third and fourth values;

receiving, at a second circuit, corresponding bits from the bit-wise region of each of the first, second, third, and fourth values;

determining a plurality of speculative results based upon the bits of the bit-wise regions of the first, second, third, and fourth values and based upon a plurality of speculative carry-in values, the speculative carry-in values being speculative of the actual first and second carry-in values; and assert an indicator indicating values of bits of the bit-wise region of a sum of the first value and the second value are equal to values of corresponding bits of the bit-wise region of a sum of the third value and the fourth value based on the first speculative result, the second speculative result, the third speculative result, and the fourth speculative result, in response to receiving the actual value of the first carry-in and the actual value of the second carry-in.

19. The method of claim 18, wherein determining the plurality of speculative results further comprises:
determining a first speculative result based on values of bits of the bit-wise region of the first value, the second value, the third value, the fourth value, and a first speculative value of the first carry-in and a first speculative value of the second carry-in;

determining a second speculative result based on values of bits of the bit-wise region of the first value, the second value, the third value, the fourth value, and the first speculative value of the first carry-in and a second speculative value of the second carry-in;

determining a third speculative result based on values of bits of the bit-wise region of the first value, the second value, the third value, the fourth value, and a second speculative value of the first carry-in and the first speculative value of the second carry-in; and determining a fourth speculative result based on values of bits of the bit-wise region of the first value, the second value, the third value, the fourth value, and the second speculative value of the first carry-in and the second speculative value of the second carry-in into the bit-wise region.

20. The method of claim 18, wherein the first value represents a base address and the second value represents an address offset, the first sum to provide an effective address associated with a first memory access request of a first program thread and corresponding to a location at a memory device, and wherein the third value represents a base address and the fourth value represents an address offset, the second sum to provide an effective address associated with a second memory access request of a second program thread and corresponding to another location at the memory device.

* * * * *